United States Patent [19]

Laauwe

[11] 4,253,609
[45] Mar. 3, 1981

[54] DISPENSING SPRAY NOZZLE

[75] Inventor: Robert H. Laauwe, Franklin Lakes, N.J.

[73] Assignee: Essex Chemical Corporation, Clifton, N.J.

[21] Appl. No.: 7,724

[22] Filed: Jan. 30, 1979

[51] Int. Cl.³ .............................................. B65D 1/32
[52] U.S. Cl. .................................. 239/327; 239/404; 239/600
[58] Field of Search ............... 239/327, 333, 311, 403, 239/404, 492, 600, 601, 602; 222/543, 545

[56] References Cited

U.S. PATENT DOCUMENTS

| 3,016,168 | 1/1962 | Larson | 222/543 |
|---|---|---|---|
| 3,235,147 | 2/1966 | Hamilton | 222/543 |
| 3,240,434 | 3/1966 | Bradley | 239/601 |
| 4,020,979 | 5/1977 | Shay et al. | 239/492 |
| 4,106,672 | 8/1978 | Tecco et al. | 222/543 |
| 4,122,979 | 10/1978 | Laauwe | 239/327 |
| 4,153,203 | 5/1979 | Tada | 239/333 |
| 4,157,789 | 6/1979 | Laauwe | 239/327 |

FOREIGN PATENT DOCUMENTS 7705747 12/1977 Netherlands ............... 239/327

Primary Examiner—Bruce H. Stoner, Jr.
Assistant Examiner—Michael J. Forman
Attorney, Agent, or Firm—Kenyon & Kenyon

[57] ABSTRACT

A dispensing spray nozzle particularly adapted for application to a squeeze bottle containing a liquid product, comprises two interfitting parts integrally formed as a single plastic injection molding and including an integral hinge on which, after being injection molded with the hinge holding the two parts side-by-side, the parts can be swung together into interfitting relation so as to produce a finished assembly ready for use.

1 Claim, 3 Drawing Figures

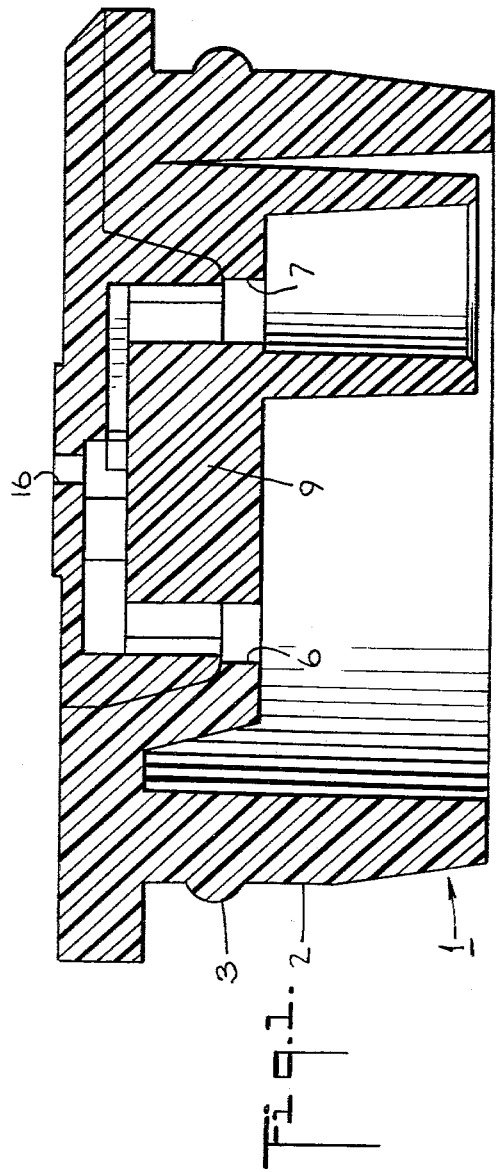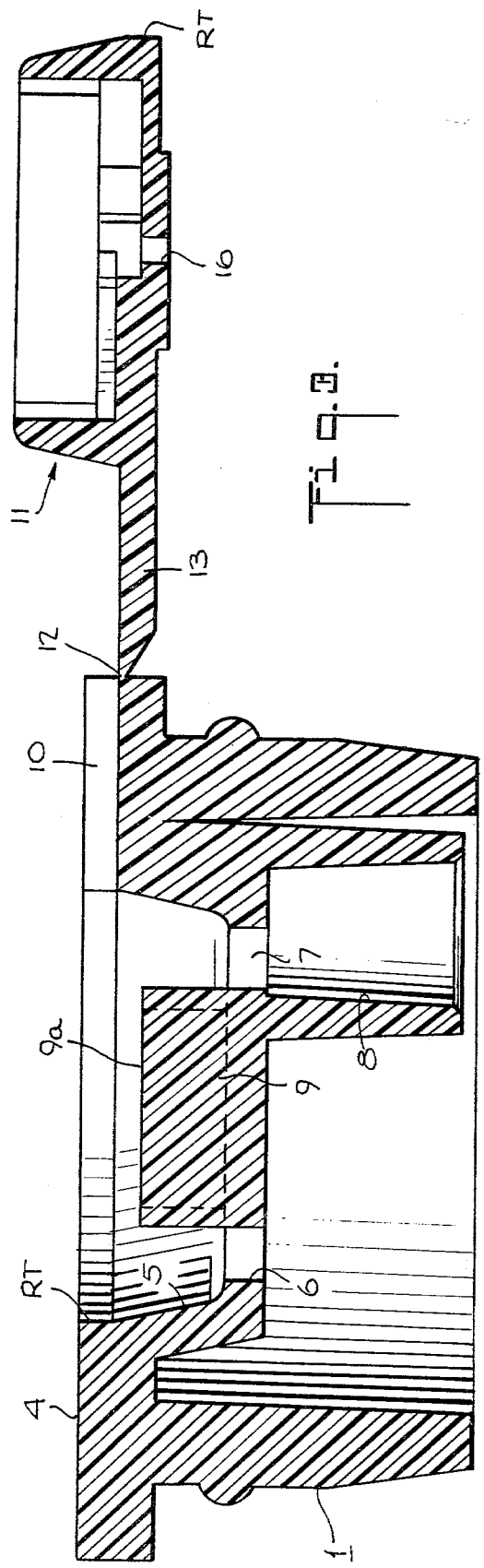

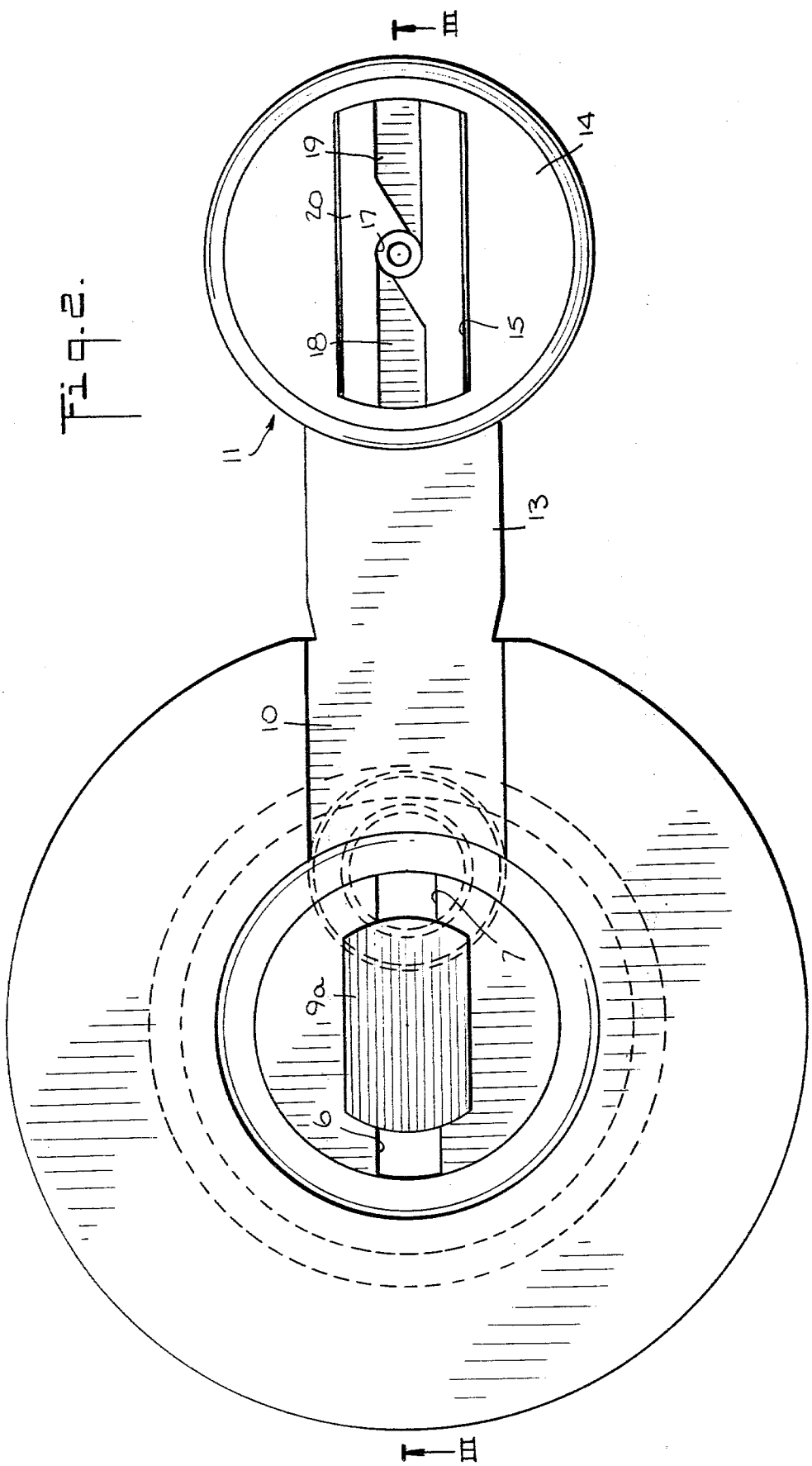

DISPENSING SPRAY NOZZLE

BACKGROUND OF THE INVENTION

Spray dispensing nozzles, and particularly such nozzles intended for application to squeeze bottles containing a liquid product, conventionally comprise an assembly of at least two interfitting parts each made as an injection molding separate from the other. For production, this requires the use of different die tools, each having cavities formed for one of the parts.

Even if a die tool can be designed having cavities for simultaneously producing both parts, the separate parts must be handled as separate parts which must be registered with each other to be fitted together to produce the nozzle assembly.

Such nozzles must be produced in quantities of millions at the lowest possible cost. Production of the nozzles as separate injection molded parts has represented a manufacturing expense which it is desirable to reduce.

The present inventor's U.S. Pat. No. 4,122,979, Oct. 31, 1978, discloses a squeeze bottle containing a liquid product such as antiperspirant and the like and having a dispensing nozzle formed by at least two separately injection molded parts and internally forming a swirl chamber having two tangential injection orifices and a central discharge orifice for this chamber. One of the injection orifices is connected to the liquid product and the other is connected to the air above the liquid product in the squeeze bottle. When the squeeze bottle is squeezed, the resulting internal pressurization separately injects the air and liquid product into the swirl chamber with the unusual result that a spray via the discharge orifice is as good an aerosol as normally produced by aerosol and pump dispensing packages. Squeeze bottle packages are inherently less expensive to produce than are aerosol and pump packages, but even so, it is desirable to reduce production costs of the squeeze bottle packages.

Such reduction is the principle object of the inventor in the present instance.

SUMMARY OF THE INVENTION

With dispensing nozzles conventionally comprising at least two parts which fit together so as to form an assembly with a first part having at least one entrance for the fluid product to be dispensed and a second part having a dispensing spray orifice connected with that entrance, the present invention provides an improvement comprising the two parts being formed by a single integrated plastic injection molding with the parts interconnected by a hinge, integrally formed with the two parts, on which the parts can swing and fit together with automatic registration to produce the assembly.

In the above way any valve assembly made of plastic injection molded parts can be simultaneously molded as an integral unit. As to each unit, the two parts are connected together and need not be handled separately. To produce the finished nozzle assembly, the two parts are merely swung together and pressed into interfitting relationship.

Particularly in the case of the nozzle assembly of the previously noted patent, substantial reduction in production and assembly costs can be realized. One part can be made in the form of a plug or stopper, which fits in the bottle mouth and forms an upwardly facing cavity having the necessarily two separated passages for the air and liquid, such as can be done by providing a post upstanding from the plug's cavity bottom between the passages. The plug's top can be formed with a groove extending from the cavity to the plug's periphery which joins with a tab and fitment via a hinge, the plug, hinge, tab and fitment being all one integral injection molding. The tab at its outer end integrally connects with the fitment with the fitment forming the swirl chamber with its two tangential injection orifices and the chamber's discharge orifice and which, as the integral unit is initially injection molded, faces upwardly with the discharge orifice pointing downwardly.

To produce the finished nozzle assembly, the tab and fitment can be swung so that the fitment fits in the plug's cavity with the tab nesting in the plug's groove and with the initially upwardly facing fitment parts now facing downwardly and by cooperation with the plug post's top producing the swirl chamber with its discharge orifice now pointing upwardly and with its tangential injection orifices respectively connected with the air and liquid product passages formed by the plug.

In this way the valve of the previously noted patent can be made by a single injection mold, handled as a single integrated unit, and quickly assembled simply by swinging over the tab fitment and pressing the two parts together.

BRIEF DESCRIPTION OF THE DRAWINGS

An example of the present invention as applied to a nozzle such as is disclosed and claimed in the previously noted patent, is illustrated by the accompanying drawings, in which:

FIG. 1 is a vertical section showing the assembled nozzle;

FIG. 2 is a top view of the integrated injection molded plug and tab fitment as injection molded; and FIG. 3 is a vertical section taken on the line III—III in FIG. 2.

DETAILED DESCRIPTION OF THE DRAWINGS

The above drawings show the plug or stopper 1 formed by a cylindrical skirt 2 which fits inside the bottle mouth and is provided with an annular rib 3 intended to cooperate with a corresponding annular recess formed in the bottle mouth. In some instances, screw threads or other designs might be used instead. The top of the plug forms a flat annular surface 4 surrounding the plug's cavity 5, the latter having a bottom in which an air hole 6 is formed together with a liquid product hole 7 diametrically opposite to the hole 6 and provided with a depending socket 8 adapted to receive the upper end of the usual dip tube which dips in the liquid product in the squeeze bottle. These holes 6 and 7 are separated from each other by an upstanding post 9 having a flat top 9a. A flat slot 10 is formed to extend radially in the plug's top surface 4 from the periphery of the cavity 5 to the outer periphery of this top 4.

The tab fitment 11 comprises the integral hinge 12 connecting the tab 13 with the outer periphery of the plug's top in alignment with the slot 10, which is in the form of a groove. The fitment itself comprises an insert which when the parts are swung together, can be press-fitted into the cavity 5, the insert and cavity being tapered but both including reverse tapers RT, or cylindrical portions, so that press-fitting holds the parts permanently together. The fitment is internally solid as indicated at 14, excepting for a recess 15 which fits around the post 9 of the plug or stopper 1. The recess 15 spans the openings 6 and 7 of the plug 1.

The bottom wall of the fitment's recess 15, which becomes inverted when the parts are swung to assembled position, is formed with the product discharge orifice 16, the bottom wall itself forming the swirl chamber 17 and the two tangential inlets 18 and 19. When the parts are swung together, as shown by FIG. 1, the outer end of the inlet 18 registers with the plug's hole 6 and the outer end of the inlet 19 registers with the plug's hole 7, thus forming the unique nozzle of the previously noted patent.

Different liquid products require swirl chamber injection orifices or inlets, and swirl chambers, of differing dimensions. Therefore, the bottom wall of the fitment forms the swirl chamber and two inlet or injection passages via an insert 20 pressed into the bottom of the recess 15 of the fitment. This is sometimes a convenience but the use of such an insert is not an absolute necessity because the swirl chamber and its inlets can be made as integral parts of the fitment 11.

Excepting for the separate insert 20 used only to permit a large number of nozzle assmeblies to be tailored to handle different liquid products, all of the parts involved comprise a single injection plastic molding. The die tools used need only have a single cavity for each assembly, all of the parts being made simultaneously by one plastic injection shot. After injection molding, the handling of separate parts is eliminated. For assembly the tab and fitment need only be swung on the integral plastic hinge 12 so that the tab 13 nests in the plug's slot or groove 10 with the fitment being press-fitted into the plug's cavity 5 and retained via the two part's reverse taper sections RT. The air and liquid are separated by the fitment's solid walls and by the flat face of the insert 20 pressing against the flat top of the plug's post 9. The air, via the plug's hole 6, connects with a swirl chamber injection passage 18 and the hole 7 connects with the other passage or inlet 19. Squeezing of the bottle causes the air and liquid to be separately injected into the swirl chamber 17 for ejection via the discharge orifice 16 with the beneficial effects described by this inventor's previously-identified patent.

As previously suggested, the insert 20 need not be used because the swirl chamber parts may be integrally formed by the fitment. On the other hand, if it is desired to produce a very large number of the nozzle assemblies to form an inventory intended to supply manufacturers of differing squeeze bottle products, the use of the insert is suggested to avoid changing the design of the basic tool cavity.

What is claimed is:

1. A dispensing nozzle comprising at least two parts which fit together so as to form an assembly, a first part having an entrance for a fluid product to be dispensed and a second part having a dispensing spray orifice connecting with said entrance; wherein the improvement comprises said two parts being formed by a single integrated plastic molding with the parts interconnected by a hinge on which the parts swing so as to fit together, said first part comprising a plug adapted to fit a bottle mouth and forming a cavity having a bottom from which a post extends upwardly with two holes opening through said bottom on opposite sides of said post, and said second part comprising a tab extending from the periphery of the first part to an internally solid insert fitting in said cavity and having a recess fitting over opposite sides of said post and spanning said two holes when said parts are swung together, the insert's recess having a bottom shaped so that when the parts are swung together it cooperates with the top of said post so as to form a swirl chamber having a central discharge orifice and tangential injection orifices with the latter respectively connecting with said holes, the top surface of said plug having a groove in which said tab nests when said parts are swung together and said insert fitting in said cavity so as to permanently hold said parts together.

* * * * *

UNITED STATES PATENT AND TRADEMARK OFFICE
Certificate

Patent No. 4,253,609            Patented March 3, 1981

Robert H. Laauwe

Application having been made by Robert H. Laauwe, the inventor named in the patent above identified, and Essex Chemical Corp., Clifton, N.J., a Corp. of N.J., the assignee, for the issuance of a certificate under the provisions of Title 35, Section 256, of the United States Code, adding the name of Stanley L. Roggenburg, Jr. as a joint inventor, and a showing and proof of facts satisfying the requirements of the said section having been submitted, it is this 19th day of April 1983, certified that the name of the said Stanley L. Roggenburg, Jr. is hereby added to the said patent as a joint inventor with the said Robert H. Laauwe.

Fred W. Sherling,
*Associate Solicitor*